(No Model.)

S. C. DRUMHELLER.
ROASTER.

No. 363,813. Patented May 31, 1887.

Witnesses.
A. Ruppert.
Thomas P. Simpson,

Inventor:
Seran C. Drumheller

UNITED STATES PATENT OFFICE.

SERAN C. DRUMHELLER, OF SUNBURY, PENNSYLVANIA.

ROASTER.

SPECIFICATION forming part of Letters Patent No. 363,813, dated May 31, 1887.

Application filed February 14, 1887. Serial No. 227,543. (No model.)

*To all whom it may concern:*

Be it known that I, SERAN C. DRUMHELLER, a citizen of the United States, residing at Sunbury, in the county of Northumberland and State of Pennsylvania, have invented certain new and useful Improvements in Roasters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to construct a meat or fowl roaster so that it will not become out of order or defective at the door, but be re-enforced, strong, and durable; also, to provide means by which the door may be easily held in a horizontal position while the roast is being inserted or removed; also, to construct the under side of the top so that it will automatically and uniformly baste the roast; also, to provide means by which the roast may be nicely "browned" before it is taken out of the roaster. It is also applicable to the baking of bread of various kinds.

Figure 1:
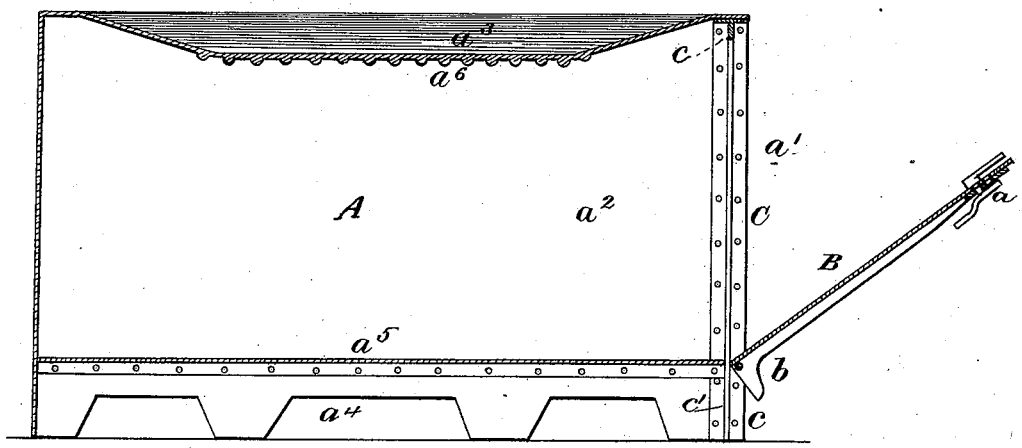
Figure 2:
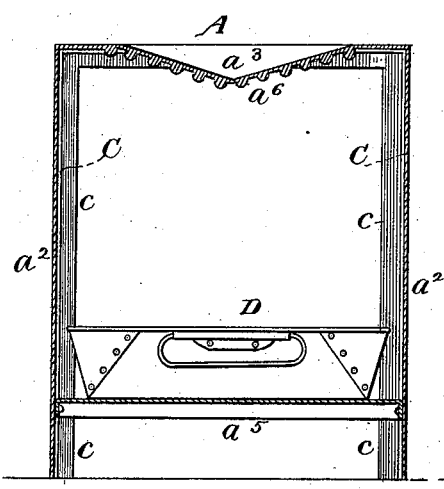
Figure 3:
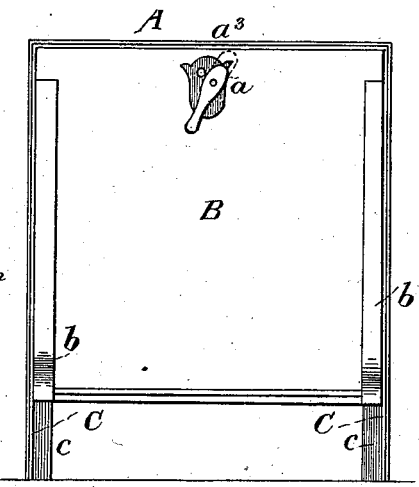

Figure 1 of the drawings is a longitudinal vertical section of my improved roaster; Fig. 2, a vertical cross-section thereof, and Fig. 3 a front elevation.

In the drawings, A represents my roaster, which consists of an oblong metallic box with an air-inlet near the top, and covered by a movable damper, $a$. This box is made with a door, B, at the front end, hinged at the bottom, and there provided with right-angled lugs $b$.

The front $a'$ of the box is stiffened with a metallic frame, C, riveted to its sides $a^2 a^2$, as well as its top $a^3$, and carried down below the bottom, so as to form the legs $cc$ and the flange $c'$. Against the latter the door is held in a horizontal position by its lug $b$, so that the roast may be easily inserted or removed. The walls are notched at $a^4$, to admit of a free circulation of air under the bottom $a^5$, on which is supported the usual pan, D.

The top of the box is inclined toward the middle in a well-known way, as shown in Fig. 2 of the drawings. Upon this bottom surface of the top I arrange the knobs or drip-points $a^6$, so that the drippings may be distributed with as much uniformity as possible over the fowl or meat, thus basting it as perfectly as if done by hand. After the roast has been thus basted and is nearly cooked, it is very desirable to "brown" it upon the outer surface, and for this purpose I open the damper $a$ until this end is completely attained.

What I claim as new, and desire to protect by Letters Patent, is—

A roaster cover concaved on top, and on the convex under side provided with the drip-points $a^6$, whereby the condensed moisture from the meat may be equally distributed over the top surface of the meat and make the basting uniform.

In testimony whereof I affix my signature in presence of two witnesses.

SERAN C. DRUMHELLER.

Witnesses:
A. RUPPERT,
THOMAS P. SIMPSON.